(12) United States Patent
Kamp et al.

(10) Patent No.: US 9,662,933 B2
(45) Date of Patent: May 30, 2017

(54) QUICK CHANGE WHEEL ASSEMBLY FOR A MACHINE

(71) Applicant: Caterpillar Inc., Peoria, IL (US)

(72) Inventors: Nathaniel R. Kamp, Peoria, IL (US);
Richard L. Joyce, Brimfield, IL (US);
Jeffrey R. Ries, Metamora, IL (US);
Joseph Unseth, Dunlap, IL (US);
David A. Vericker, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 159 days.

(21) Appl. No.: 14/612,936

(22) Filed: Feb. 3, 2015

(65) Prior Publication Data

US 2016/0221390 A1    Aug. 4, 2016

(51) Int. Cl.
*B60B 3/14* (2006.01)
*B60B 23/04* (2006.01)
*B60B 29/00* (2006.01)

(52) U.S. Cl.
CPC .............. *B60B 3/14* (2013.01); *B60B 23/04* (2013.01); *B60B 29/003* (2013.01); *B60B 2900/731* (2013.01); *B60Y 2200/41* (2013.01); *Y10T 403/10* (2015.01); *Y10T 403/7018* (2015.01)

(58) Field of Classification Search
CPC  B60B 3/14; B60B 23/00; B60B 23/04; Y10T 403/10; Y10T 403/7005; Y10T 403/7018; Y10T 403/7021; Y10T 403/7026; Y10T 403/7035
USPC ..... 301/9.1, 10.1, 11.1, 11.2, 14, 18, 19, 25, 301/111.01, 118, 120, 111.02
See application file for complete search history.

(56) References Cited

U.S. PATENT DOCUMENTS

| | | | | |
|---|---|---|---|---|
| 1,577,455 A | * | 3/1926 | Dulany | B60B 25/16 301/35.2 |
| 2,490,486 A | * | 12/1949 | Spurlock | B60B 3/18 301/35.61 |
| 2,556,151 A | * | 6/1951 | Bremer | F16D 1/096 403/356 |
| 3,680,742 A | * | 8/1972 | Patterson | A01C 7/125 222/367 |

(Continued)

FOREIGN PATENT DOCUMENTS

| | | |
|---|---|---|
| GB | 2191267 | 12/1987 |
| JP | 08-230509 | 9/1996 |
| KR | 2014-0023828 | 2/2014 |

*Primary Examiner* — S. Joseph Morano
*Assistant Examiner* — Scott A Browne
(74) *Attorney, Agent, or Firm* — Finnegan, Henderson, Farabow, Garrett & Dunner, LLP

(57) ABSTRACT

A wheel assembly is disclosed. The wheel assembly may have a hub with a first spline, a second spline, and a slot separating the first spline and the second spline. The first spline, the second spline, and the slot may extend from a front end to a rear end. The wheel assembly may also have an outer rim configured to mount a tire. The wheel assembly may further have an inner rim extending from a rim front end to a rim rear end. The inner rim may have a notch disposed at the rim front end and a tab disposed at the rim rear end. The tab may slidingly engage with the slot. The wheel assembly may have a locking block, which may slidingly engage with the notch and the slot at the front end. Further, the wheel assembly may have a bolt connecting the mounting block to the hub.

20 Claims, 5 Drawing Sheets

(56) References Cited

U.S. PATENT DOCUMENTS

| | | | | |
|---|---|---|---|---|
| 3,930,683 A * | 1/1976 | MacKeown | ............ | B60B 25/00 152/412 |
| 4,013,499 A * | 3/1977 | Benigni | ................ | B29D 30/56 156/394.1 |
| 4,153,303 A * | 5/1979 | Tanner | ...................... | B60B 5/02 152/323 |
| 4,218,098 A * | 8/1980 | Burton | ................ | A63C 17/223 152/323 |
| 4,416,650 A | 11/1983 | Wilkins | | |
| 4,426,116 A * | 1/1984 | Spivey | ................... | B60B 3/002 301/10.1 |
| 4,438,836 A * | 3/1984 | Kagata | ................... | B60B 27/02 192/36 |
| 4,896,899 A * | 1/1990 | Lawrence | ................ | B60B 5/02 152/409 |
| 5,094,643 A * | 3/1992 | Bolli | ...................... | A63H 33/04 403/348 |
| 5,314,241 A * | 5/1994 | Cheng | ................... | B60B 37/10 301/111.06 |
| 5,328,252 A * | 7/1994 | Thompson | ............. | B60B 23/10 301/105.1 |
| 5,408,854 A * | 4/1995 | Chiu | ...................... | B60B 37/04 301/111.02 |
| 5,564,793 A * | 10/1996 | Whiteford | ................ | B60B 5/02 301/104 |
| 5,626,435 A * | 5/1997 | Wohlhuter | ............... | B60D 1/52 280/416.1 |
| 5,829,844 A * | 11/1998 | Slankard | ............... | B60B 27/023 301/110.5 |
| 5,902,018 A * | 5/1999 | Owen | .................... | B60B 37/10 301/111.03 |
| 6,059,374 A | 5/2000 | Goddard | | |
| 6,439,671 B1 * | 8/2002 | Lehnhardt | ............... | B21C 23/14 29/894.341 |
| 6,443,530 B1 * | 9/2002 | Lee | ........................... | B60B 7/20 301/111.01 |
| D488,715 S * | 4/2004 | Plumer | ........................... | D8/397 |
| 6,910,742 B2 * | 6/2005 | Flood | ..................... | B60B 37/10 301/111.01 |
| 7,595,565 B2 * | 9/2009 | Chen | ........................... | F03D 1/00 290/55 |
| 7,770,764 B2 * | 8/2010 | Rock | ..................... | B62D 35/02 224/42.12 |
| 8,292,018 B2 * | 10/2012 | Huang | ................... | B60B 19/00 180/220 |
| D684,678 S * | 6/2013 | Okada | ........................ | D23/411 |
| D686,677 S * | 7/2013 | Simonds | ..................... | D12/160 |
| 8,608,253 B1 * | 12/2013 | Sheefel | .................... | B60B 37/10 301/105.1 |
| 8,678,518 B2 * | 3/2014 | Rivera | ................... | B60B 11/06 301/105.1 |
| 9,221,662 B2 * | 12/2015 | Bielmeier | ................ | B67B 3/00 |
| 9,259,968 B2 * | 2/2016 | Tracey | ............... | B60B 33/0063 |
| 9,320,962 B2 * | 4/2016 | Krell | ................... | A63C 17/223 |
| 2006/0164500 A1 * | 7/2006 | Marumoto | ........... | G03G 15/757 347/139 |
| 2007/0035106 A1 * | 2/2007 | Thorpe | ..................... | B60B 3/14 280/260 |
| 2009/0189311 A1 * | 7/2009 | Quillin | .................... | A61Q 1/04 264/300 |
| 2010/0010455 A1 * | 1/2010 | Elahi | ................... | A61M 5/3135 604/208 |
| 2014/0062165 A1 * | 3/2014 | Hannah | ................... | B60B 23/10 301/11.1 |
| 2014/0250627 A1 * | 9/2014 | McKay | ................ | B60B 33/0028 16/45 |

* cited by examiner

QUICK CHANGE WHEEL ASSEMBLY FOR A MACHINE

TECHNICAL FIELD

The present disclosure relates generally to a quick change wheel assembly and, more particularly, to a quick change wheel assembly for a machine.

BACKGROUND

Machines, for example, construction or mining equipment typically include traction devices that help the machines to move about a work area. In many cases, the traction devices include one or more wheels attached to one or more axles. A typical method for attaching a wheel to an axle of a machine utilizes a set of bolts arranged in a generally circular pattern. The bolts travel through a portion of the rim of the wheel and attach to the machine's axle. As a result, the bolts experience very large forces because the rim transfers the full load of the wheel-to-hub joint to the bolts.

The number of bolts used to attach a wheel depends on the amount of load that the wheel must carry. Usually, a relatively larger number of bolts helps to reduce the load on each bolt. A large number of bolts, however, makes it time consuming to attach or remove the bolts during wheel removal or assembly. Furthermore, a large number of bolts increases the likelihood that some bolts may not get torqued or may get torqued to an incorrect torque.

U.S. Pat. No. 4,416,650 of Wilkins that issued on Nov. 22, 1983 ("the '650 patent") discloses a drive wheel and sprocket assembly. The '650 patent discloses that the sprocket assembly includes a hub that has a plurality of circumferentially spaced, axially extending grooves, which terminate in shoulders. The '650 patent further discloses that each groove includes a pocket that is radially undercut in the base of the groove at a shoulder. The '650 patent discloses a drive wheel formed of resilient polymeric material. The '650 patent discloses that the drive wheel includes a plurality of ribs extending axially and circumferentially spaced to be received in the grooves of the sprocket assembly hub. Additionally, the '650 patent discloses that the ribs include teeth configured to snap into the pockets in the grooves of the sprocket assembly hub. According to the '650 patent, to assemble the drive wheel, the drive wheel teeth are slidably forced over the hub and that because of the resiliency of the drive wheel material, the teeth can be forced over the grooves and into the pockets at the end of the grooves. The '650 patent discloses that the teeth prevent relative axial movement and the ribs prevent relative rotational movement between the drive wheel and the sprocket assembly.

Although the disclosed drive wheel and sprocket assembly of the '650 patent may allow mounting of a drive wheel onto a hub without using bolts, it may still be less than optimal. In particular, the disclosed wheel and sprocket assembly of the '650 patent requires the drive wheel to be made of resilient material so that the teeth can be pushed over the hub to snap into the pockets in the hub. The configuration disclosed in the '650 patent may be unsuitable for use with hubs and wheels for construction and mining equipment, which cannot be made of resilient material. Moreover, after assembly of the drive wheel onto the hub, engagement of the teeth with the pockets may prevent easy removal of the drive wheel from the hub making it difficult to repair or replace the drive wheel.

The quick change wheel assembly of the present disclosure solves one or more of the problems set forth above and/or other problems of the prior art.

SUMMARY

In one aspect, the present disclosure is directed to a wheel assembly. The wheel assembly may include a hub. The hub may include a first spline, a second spline, and a slot separating the first spline and the second spline. The first spline, the second spline, and the slot may extend from a front end to a rear end. The wheel assembly may also include an outer rim configured to mount a tire. The wheel assembly may further include an inner rim extending from a rim front end to a rim rear end. The inner rim may include a notch disposed at the rim front end and a tab disposed at the rim rear end. The tab may be configured to slidingly engage with the slot. The wheel assembly may also include a locking block configured to slidingly engage with the notch and the slot at the front end. In addition, the wheel assembly may include a bolt connecting the mounting block to the hub.

In another aspect, the present disclosure is directed to a hub. The hub may include a splined portion extending from a front end to a rear end. The splined portion may include a first spline extending along a length of the splined portion. The splined portion may also include a second spline extending along the length of the splined portion. The splined portion may further include a slot separating the first spline and the second spline. The hub may also include a stub extending between the rear end and a stub end. In addition the hub may also include a base extending between the stub end and a base end. The splined portion, the stub, and the base may be disposed coaxially.

In yet another aspect, the present disclosure is directed to a rim for a wheel. The rim may include an outer rim configured to mount a tire. The rim may also include an inner rim attached to the outer rim. The inner rim may extend from a rim front end to a rim rear end. The inner rim may include an inner surface. The inner rim may also include a notch disposed at the rim front end. The notch may extend from the rim front end to a notch end disposed between the rim front end and the rim rear end. The inner rim may also include a tab disposed at the rim rear end. The tab may extend radially inward from the inner surface.

DETAILED DESCRIPTION

Figure 1:
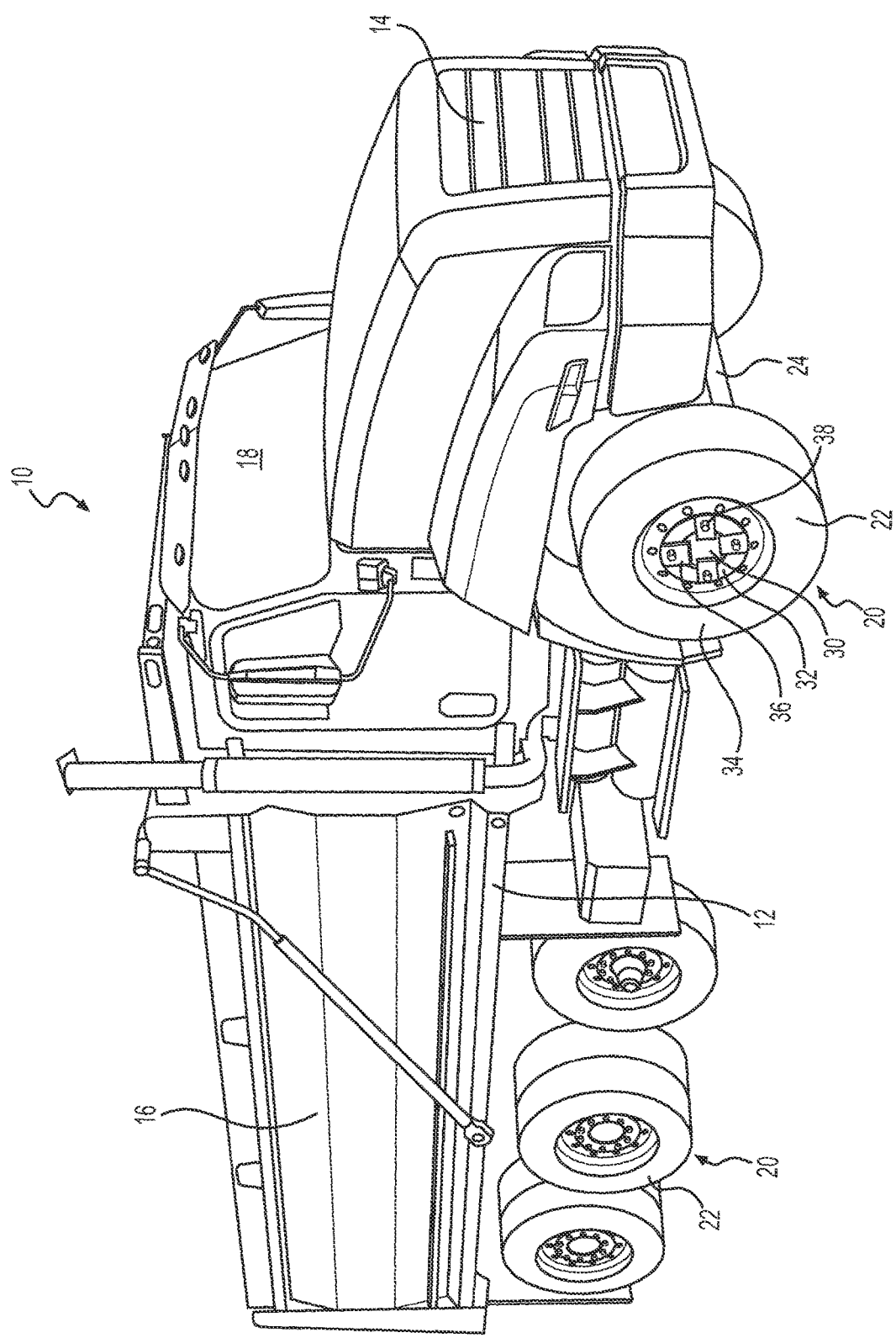
FIG. 1 is a pictorial illustration of an exemplary disclosed machine equipped with wheel assemblies.

FIG. 1 illustrates an exemplary embodiment of a machine 10. Machine 10 may be a machine that performs some type of operation associated with an industry such as mining, construction, farming, earthmoving, or another industry known in the art. For example, as shown in FIG. 1, machine 10 may be a dump truck. Machine 10 may have a platform 12 that supports an engine 14 and a truck bed 16. Machine 10 may also have an operator cabin 18 that may include controls allowing an operator to control operation of machine 10. Platform 12 of machine 10 may be supported by a plurality of wheel assemblies 20. Wheel assemblies 20 may include wheels 22, which may be attached to axles 24 of machine 10. Wheel assembly 20 may include hub 30, which may be connected to axle 24. Wheel assembly 20 may also include a wheel 22, which may include a rim 32 and a tire 34 mounted on rim 32. In addition, wheel assembly 20 may include locking blocks 36, which may be attached to hub 30 and rim 32 via bolts 38

Figure 2:
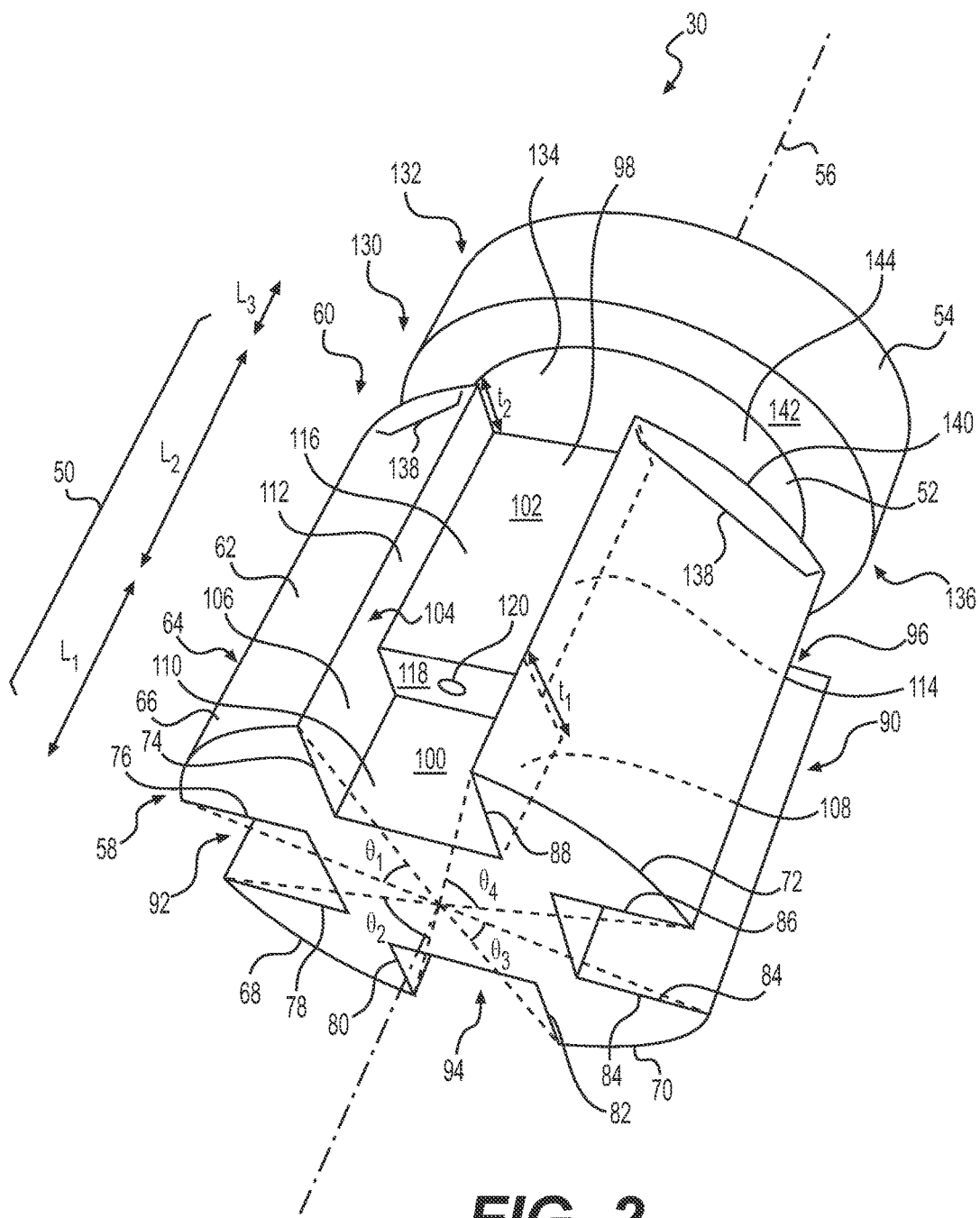
FIG. 2 is an isometric view of an exemplary disclosed hub for the wheel assembly of FIG. 1.

FIG. 2 illustrates an isometric view of an exemplary embodiment of hub 30. Hub 30 may include splined portion 50, stub 52, and base 54, all of which may be coaxially disposed around an axis 56, which may be an axis of rotation of wheel assembly 20. Splined portion 50 may extend from front end 58 to rear end 60. Splined portion 50 may have a generally cylindrical outer surface 62, which may have a first diameter "$D_1$". Splined portion 50 may include one or more splines 64. For example, as illustrated in FIG. 2, splined portion 50 may include first spline 66, second spline 68, third spline 70, and fourth spline 72. First spline 66 may extend along a length of splined portion 50 from front end 58 to rear end 60. Likewise, second spline 68, third spline 70, and fourth spline 72 may also extend along the length of splined portion 50 from front end 58 to rear end 60.

First spline 66 may extend circumferentially from first leading edge 74 to first trailing edge 76 spanning first spline angle "$\theta_1$." Second spline 68 may extend circumferentially from second leading edge 78 to second trailing edge 80 spanning second spline angle "$\theta_2$." Third spline 70 may extend circumferentially from third leading edge 82 to third trailing edge 84 spanning third spline angle "$\theta_3$." Fourth spline 72 may extend circumferentially from fourth leading edge 86 to fourth trailing edge 88 spanning fourth spline angle "$\theta_4$." It is contemplated that first, second, third, and fourth spline angles $\theta_1$, $\theta_2$, $\theta_3$, $\theta_4$ may be equal or unequal.

Adjacent splines on hub 30 may be circumferentially separated by slots 90. For example, as illustrated in FIG. 2, first spline 66 may be circumferentially separated from second spline 68 by first slot 92. Second spline 68 may be circumferentially separated from third spline 70 by second slot 94. Third spline 70 may be circumferentially separated from fourth spline 72 by third slot 96. Fourth spline 72 may be separated from first spline 66 by fourth slot 98. Each of first, second, third, and fourth slots 92, 94, 96, 98 may extend along a length of splined portion 50 from front end 58 to rear end 60.

First slot 92 may include a locking slot 100 and a guiding slot 102. Locking slot 100 may be configured to slidingly receive locking block 36. Locking slot 100 may extend from front end 58 to a distal end 104 disposed between front end 58 and rear end 60. Locking slot 100 may have a length "$L_1$." Locking slot may include side surfaces 106, 108, and bottom surface 110 extending from side surface 106 to side surface 108. Locking slot 100 may have a generally rectangular cross-section so that side surfaces 106, 108 may be generally orthogonal to bottom surface 110. It is contemplated, however, that side surfaces 106, 108 may be inclined at the same or different angles relative to bottom surface 110. It is further contemplated that locking slot 100 may have a square, triangular, circular, elliptical, polygonal, or any other type of cross-section known in the art.

Guiding slot 102 may extend from distal end 104 to rear end 60. Guiding slot 102 may have a length "$L_2$." In one exemplary embodiment, length $L_2$ of guiding slot 102 may be larger than length $L_1$ of locking slot 100. It is contemplated, however, that length $L_2$ of guiding slot 102 may be equal to or smaller than length $L_1$ of locking slot 100. Guiding slot 102 may also have a generally rectangular cross-section. Guiding slot 102 may include side surfaces 112, 114 and bottom surface 116 extending from side surface 112 to side surface 114. Guiding slot 102 may have a generally rectangular cross-section so that side surfaces 112, 114 may be generally orthogonal to bottom surface 116. It is contemplated, however, that side surfaces 112, 114 may be inclined at the same or different angles relative to bottom surface 116. It is further contemplated that guiding slot 102 may have a square, triangular, circular, elliptical, polygonal, or any other type of cross-section known in the art.

Locking slot 100 may have a first radial depth "$t_1$." Guiding slot 102 may have a second radial depth "$t_2$." In one exemplary embodiment, radial depth $t_1$ may be larger than radial depth $t_2$. Guiding slot 102 may be radially separated from locking slot 100 by a shoulder 118, which may extend from bottom surface 110 of locking slot 100 to bottom surface 116 of guiding slot 102. In one exemplary embodiment, shoulder 118 may be disposed orthogonal to bottom surfaces 110, 116. In another exemplary embodiment, shoulder 118 may be inclined at an angle relative to bottom surfaces 110, 116. Bolt hole 120 may be disposed on shoulder 118. Bolt hole 120 may be threaded and may be configured to threadingly receive bolt 38. Although FIG. 2 illustrates shoulder 118 having only one bolt hole 120, it is contemplated that shoulder 118 may have more than one bolt hole 120. Second, third, and fourth slots 94, 96, 98 may have a structure and function similar to that described above for first slot 92. Further, although FIG. 2 illustrates only four splines 66, 68, 70, 72 and four slots 92, 94, 96, 98, it is contemplated that hub 30 may have any number of splines 64 and slots 90.

Figure 3:
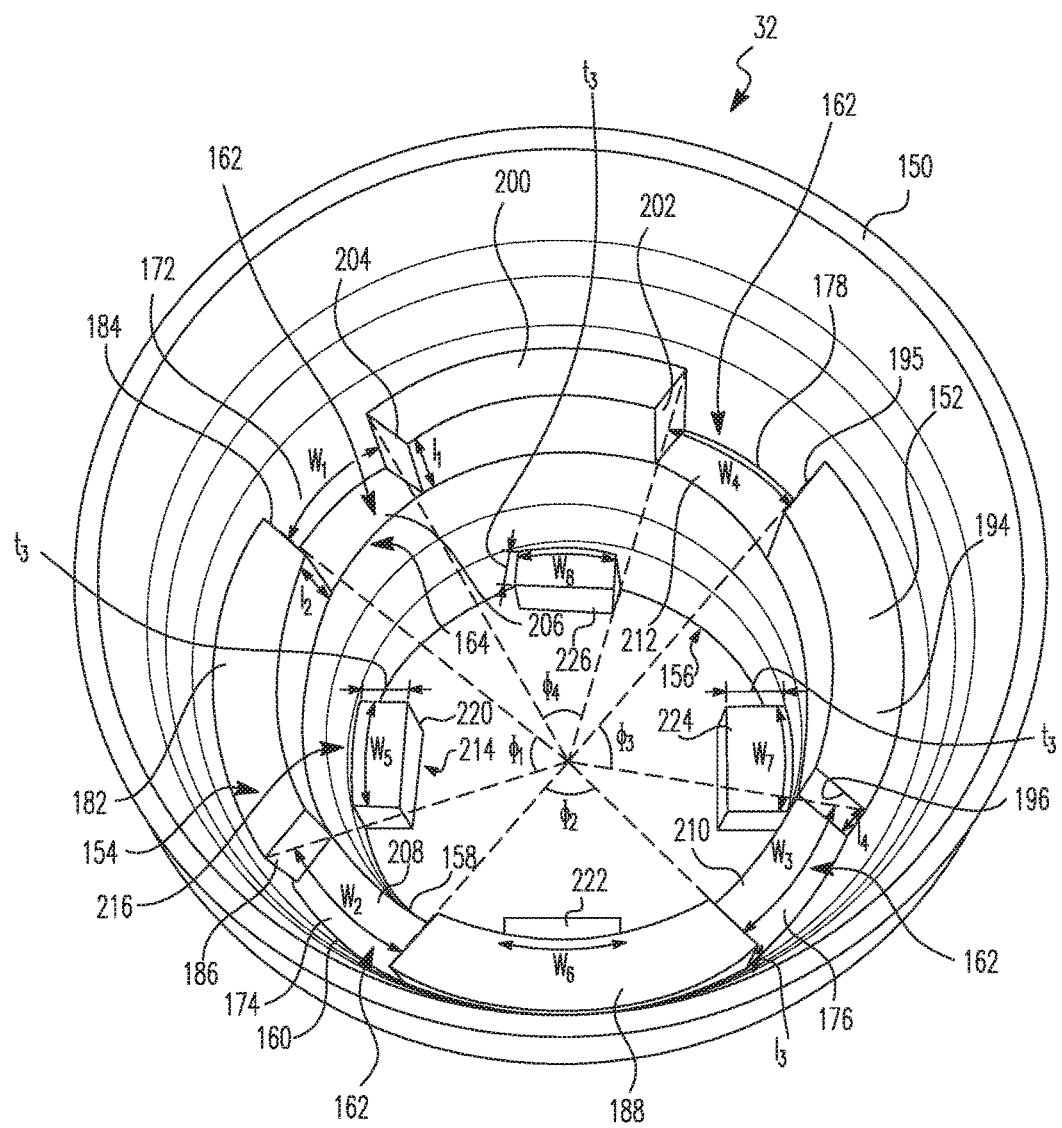
FIG. 3 is an isometric view of an exemplary disclosed rim for the wheel assembly of FIG. 1.

Stub 52 may extend from rear end 60 to stub end 130. Stub 52 may have a generally cylindrical outer surface 132, which may have a diameter "$D_2$." In one exemplary embodiment, as illustrated in FIG. 3, diameter $D_2$ of stub 52 may be smaller than diameter $D_1$ of splined portion 50. Stub 52 may have a length "$L_3$," which may be the same as or different from length "$L_1$" of locking slot 100 and length "$L_2$" of guiding slot 102.

Base 54 may be attached to stub 52 at stub end 130. Base 54 may extend from stub end 130 to a base end 134 and may be attached to an axle 24 of machine 10 at base end 134. Base 54 may have a generally cylindrical shape. It is contemplated, however, that base 54 may have an elliptical, square, rectangular, polygonal, or any other type of shape known in the art. In one exemplary embodiment, base 54 may have a diameter "$D_3$," which may be smaller than diameter $D_1$ of splined portion 50. Splined portion 50, stub 52, and base 54 may define an annular channel 136 disposed between rear end 60 and stub end 130.

Channel 136 may include tab lock portions 138. Each tab lock portion 138 may have a front wall 140 defined by spline 64, a rear wall 142 defined by base 54, and bottom wall 144, which may be a portion of outer surface 132 of stub 52. As illustrated in FIG. 2, bottom wall 144 may extend from front wall 140 to rear wall 142. Front wall 140 and rear wall 142 may be disposed generally orthogonal to bottom wall 144. It is contemplated, however, that front wall 140 and rear wall 142 may be disposed at an angle relative to bottom wall 144. Although FIG. 2 illustrates one channel 136 as being disposed between rear end 60 and stub end 130, it is contemplated that additional channels 136 may be disposed in splined portion 50 between front end 58 and rear end 60.

FIG. 3 illustrates a pictorial view of an exemplary embodiment of rim 32. Rim 32 may include outer rim 150 and inner rim 152. In one exemplary embodiment, outer rim 150 and inner rim 152 may form an integral structure, which may be made, for example, by a casting process or a forging process. In another exemplary embodiment, outer rim 150 may be attached to inner rim 152 using welds, fasteners, or any other method of attachment known in the art. Outer rim 150 may be configured to mount a tire 34. Outer rim 150 may include one or more air openings (not shown) that allow a suitable air tubing or valve assembly to be installed therewith to inflate or deflate tire 34.

Inner rim 152 may extend from a rim front end 154 to a rim rear end 156. Inner rim 152 may have a generally tubular shape with an inner surface 158 and an outer surface 160. Inner rim 152 may include one or more notches 162 extending radially from inner surface 158 to outer surface 160. Each notch 162 may also extend axially from rim front end 154 to a notch end 164 disposed between rim front end 154 and rim rear end 156. For example, as illustrated in FIG. 3, inner rim 152 may include first notch 172, second notch 174, third notch 176, and fourth notch 178. First, second, third, and fourth notches 172, 174, 176, 178 may have circumferential widths "$w_1$," "$w_2$," "$w_3$," and "$w_4$," respectively. It is contemplated that circumferential widths $w_1$, $w_2$, $w_3$, and $w_4$ may be equal or unequal. First, second, third, and fourth notches 172, 174, 176, 178 may have axial depths "$l_1$," "$l_2$," "$l_3$," and "$l_4$," respectively, which may be equal or unequal. Widths $w_1$, $w_2$, $w_3$, and $w_4$ and depths $l_1$, $l_2$, $l_3$, and $l_4$ may be selected so that locking blocks 36 may be slidingly receivable in first, second, third, and fourth notches 172, 174, 176, 178. Although FIG. 3 illustrates only four notches 172, 174, 176, 178, it is contemplated that inner rim 152 may have any number of notches 162.

Rim sections 180 may be circumferentially disposed between notches 162. For example, as illustrated in FIG. 3, first rim section 182 may be disposed between first notch 172 and second notch 174. First rim section 182 may extend circumferentially from first leading rim wall 184 to first trailing rim wall 186, spanning a first rim section angle "$\phi_1$." Second rim section 188 may be disposed between second notch 174 and third notch 176. Second rim section 188 may extend circumferentially from second leading rim wall 190 to second trailing rim wall 192, spanning a second rim section angle "$\phi_2$." Third rim section 194 may be disposed between third notch 176 and fourth notch 178. Third rim section 194 may extend circumferentially from third leading rim wall 196 to third trailing rim wall 198, spanning a third rim section angle "$\phi_3$." Fourth rim section 200 may be disposed between fourth notch 178 and first notch 172. Fourth rim section 200 may extend circumferentially from fourth leading rim wall 202 to fourth trailing rim wall 204, spanning a fourth rim section angle "$\phi_4$." First, second, third, and fourth rim section angles $\phi_1$, $\phi_2$, $\phi_3$, and $\phi_4$ may be equal or unequal.

As also illustrated in FIG. 3, first notch 172 may be defined by first leading rim wall 184, fourth trailing rim wall 204 and first notch bottom wall 206. First leading rim wall 184 and fourth trailing rim wall 204 may be disposed generally orthogonal to or inclined relative to first notch bottom wall 206. Second notch 174 may be defined by second leading rim wall 190, first trailing rim wall 186 and second notch bottom wall 208. Second leading rim wall 190 and first trailing rim wall 186 may be disposed generally orthogonal to or inclined relative to second notch bottom wall 208. Third notch 176 may be defined by third leading rim wall 196, second trailing rim wall 192 and third notch bottom wall 210. Third leading rim wall 196 and second trailing rim wall 192 may be disposed generally orthogonal to or inclined relative to third notch bottom wall 210. Fourth notch 178 may be defined by fourth leading rim wall 202, third trailing rim wall 198 and fourth notch bottom wall 212. Fourth leading rim wall 202 and third trailing rim wall 198 may be disposed orthogonal to or inclined relative to fourth notch bottom wall 212. Although FIG. 3 illustrates only four rim sections 182, 188, 194, 200, it is contemplated that inner rim 152 may have any number of rim sections 180. Likewise, although FIG. 3 illustrates only four notches 172, 174, 176, 176, it is contemplated that inner rim 152 may have any number of notches 162.

Inner rim 152 may also include one or more tabs 214 disposed adjacent rim rear end 156 and extending radially inward from inner surface 158. Tabs 214 may also extend axially from rim rear end 156 to tab end 216 disposed between notch end 164 and rim rear end 156. In one exemplary embodiment as illustrated in FIG. 3, inner rim 152 may include four tabs, 220, 222, 224, 226. First tab 220 may extend from rim rear end 156 to tab end 216 and may be circumferentially located between first leading rim wall 184 and first trailing rim wall 186. First tab 220 may have a circumferential width "$w_5$," which may be the same as or different from circumferential width $w_1$ of first rim section 182. Second tab 222 may extend from rim rear end 156 to tab end 216 and may be circumferentially located between second leading rim wall 190 and second trailing rim wall 192. Second tab 222 may have a circumferential width "$w_6$," which may be the same as or different from circumferential width $w_2$ of second rim section 188. Third tab 224 may extend from rim rear end 156 to tab end 216 and may be circumferentially located between third leading rim wall 196 and third trailing rim wall 198. Third tab 224 may have a circumferential width "$w_7$," which may be the same as or different from circumferential width $w_3$ of third rim section 194. Fourth tab 226 may extend from rim rear end 156 to tab end 216 and may be circumferentially located between fourth leading rim wall 202 and fourth trailing rim wall 204. Fourth tab 226 may have a circumferential width "$w_8$," which may be the same as or different from circumferential width $w_4$ of fourth rim section 200. Thus, first, second, third, and fourth tabs 220, 222, 224, 226 may be angularly offset from first, second, third, and fourth notches 172, 174, 176, 178, respectively. In other words, first, second, third, and fourth tabs 220, 222, 224, 226 may not be circumferentially aligned with first, second, third, and fourth notches 172, 174, 176, 178, respectively.

First, second, third, and fourth tabs 220, 222, 224, 226 may have a radial depth "$t_3$," which may be smaller than depth $t_2$ of first, second, third, and fourth slots 92, 94, 96, 98, respectively, of hub 30. In one exemplary embodiment, first, second, third, and fourth tabs 220, 222, 224, 226 may be configured to be slidingly received in first, second, third, and fourth slots 92, 94, 96, 98.

Figure 4:
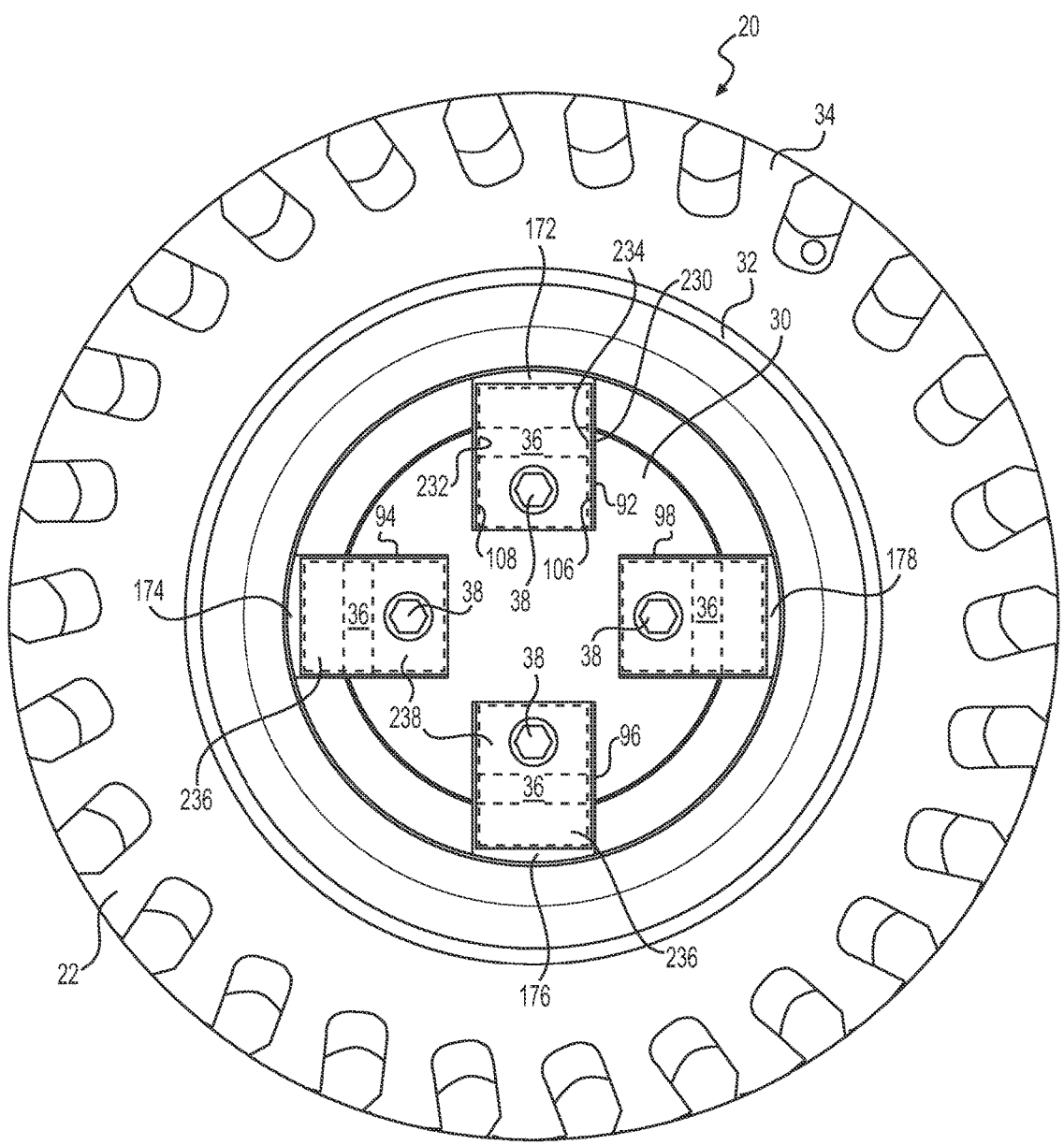
FIG. 4 is an isometric view illustrating an exemplary disclosed assembly of the rim of FIG. 3 onto the hub of FIG. 2 when fully assembled.

FIG. 4 shows a pictorial view of an exemplary embodiment of a wheel assembly 20. As illustrated in FIG. 4, wheel assembly 20 may include a rim 32 with a tire 34 mounted on rim 32. Rim 32 may circumscribe hub 30. First, second, third, and fourth slots 92, 94, 96, 98 in hub 30 may be circumferentially aligned with first, second, third, and fourth notches 172, 174, 176, 178. A locking block 36 may be slidingly received in first slot 92 and first notch 172. Locking block 36 may have a shape that allows side surface 230 of locking block 36 to slidingly abut with side surface 106 of first slot 92. Locking block 36 may also have side surface 232 that may slidingly abut with side surface 108 of first slot 92. In addition, locking block may have a bottom surface 234 that may abut bottom surface 110 of first slot 92. Likewise, side surface 230 of locking block 36 may also slidingly abut fourth trailing rim wall 204. Side surface 232 of locking block 36 may slidingly abut first leading rim wall 184. A first portion 236 of bottom surface 234 of locking block 36 may abut first notch bottom wall 206. A second portion 238 of bottom surface 234 of locking block 36 may abut shoulder 118. Locking block 36 may include a hole (not shown) that receives bolt 38. Bolt 38 may pass through the hole in locking block 36 and may be threadingly received in bolt hole 120 in shoulder 118 (see FIG. 2). Bolt 38 may attach locking block 36 to hub 30. Locking blocks 36 may be received in second, third, and fourth slots 94, 96, 98 and second, third, and fourth notches 174, 176, 178 and attached to hub 30 in a similar manner.

An exemplary method of assembling rim 32 on hub 30 to form wheel assembly 20 will be described in the following sections.

INDUSTRIAL APPLICABILITY

The disclosed wheel assembly 20 may be implemented on any machine 10 supported by one or more wheels 22. In particular the disclosed wheel assembly 20 may simplify assembly and disassembly of wheel 22 onto axle 24 for repair or replacement of wheel 22. Further, the disclosed wheel assembly 20 may reduce the number of bolts 38 required to assemble wheel 22 onto axle 24.

Figure 5:
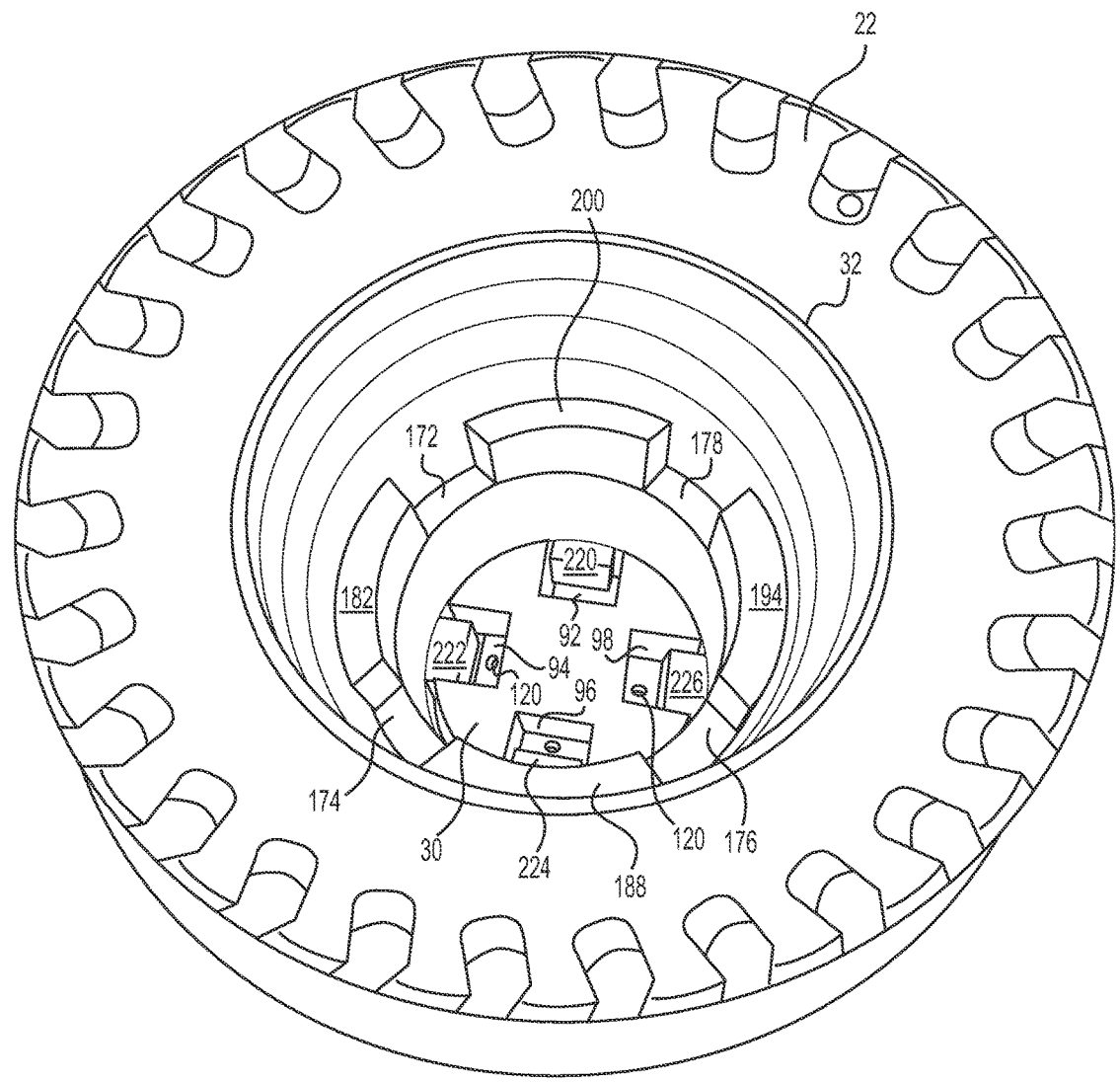
FIG. 5 is a pictorial view of an exemplary wheel assembly for the machine of FIG. 1 when the hub of FIG. 2 is partially assembled onto the rim of FIG. 3.

FIG. 5 illustrates an exemplary assembly of wheel 22 onto hub 30, which may be connected to axle 24 of machine 10. As illustrated in FIG. 5, wheel 22 may be aligned with hub 30 so that first, second, third, and fourth tabs 220, 222, 224, 226, are slidingly received in first, second, third, and fourth slots 92, 94, 96, 98, respectively. Rim 32 may be pushed onto hub 30 so that first, second, third, and fourth tabs 220, 222, 224, 226 slide within first, second, third, and fourth slots 92, 94, 96, 98, respectively, until first, second, third, and fourth tabs 220, 222, 224, 226 abut rear wall 142 of channel 136 (see FIG. 2). Wheel 22 may be turned in a clockwise or counter-clockwise direction so that first, second, third, and fourth tabs 220, 222, 224, 226 slidingly travel along channel 136, until first, second, third, and fourth tabs 220, 222, 224, 226 are received in tab lock portions 138. In this position, axial movement of first tab 220, and therefore axial movement of hub 30, for example, may be prevented by front wall 140 and rear wall 142 of tab lock portion 138 (see FIG. 2). Axial movement of second, third, and fourth tabs 222, 224, 226 may also be prevented in a similar manner by tab lock portions 138. Wheel 22 may be turned in a clockwise or counter-clockwise direction until first, second, third, and fourth notches 172, 174, 176, 178 are circumferentially aligned with locking slots 100 in first, second, third, and fourth slots 92, 94, 96, 98, respectively.

Referring to FIGS. 2-5, locking blocks 36 may be inserted into first, second, third, and fourth notches 172, 174, 176, 178, so that first portions 236 of bottom surfaces 234 of locking blocks 36 engage with and abut first, second, third, and fourth notch bottom walls 206, 208, 210, 212, respectively. Second portions 238 of bottom surfaces 234 of locking blocks 36 may also engage with and abut shoulders 118 of first, second, third, and fourth slots 92, 94, 96, 98, respectively. Bolts 38 may be inserted through holes (not shown) in locking blocks 36 to threadingly engage with bolt holes 120 in shoulders 118. Bolts 38 may be torqued to a predetermined torque to fasten wheel 22 onto hub 30 of axle 24.

Allowing first, second, third, and fourth tabs 220, 222, 224, 226 to be received in tab lock portions 138 may help reduce or eliminate axial movement of wheel 22 on hub 30. Side surfaces 232 of locking blocks 36 may engage with first, second, third, fourth leading rim walls 184, 190, 196, 202 to transfer torque from hub 30 to wheel 22 during, for example, counter-clockwise rotation of wheel 22 (see FIG. 4). Likewise, side surfaces 230, 232 of locking blocks 36 may engage with first, second, third, fourth, trailing rim walls 186, 192, 198, 204 to transfer torque from hub 30 to wheel 22 during, for example, clockwise rotation of wheel 22 (see FIG. 4). Moreover, the load carried by wheel assembly 20 may be supported by hub 30. In the disclosed wheel assembly 20, because bolts 38 serve only to attach locking blocks 36 to hub 30 and because bolts 38 do not carry the load supported by wheel assembly 20, the disclosed wheel assembly 20 may require fewer bolts 38 to attach wheel 22 to hub 30. Reducing the number of bolts 38 may help reduce the time required to assemble or disassemble wheel 22 on or from hub 30 of machine 10 allowing quick change of wheels 22 on machine 10. Further, reducing the number of bolts 38 may help reduce instances of no torque or incorrect torque on bolts 38.

Although assembly of one wheel 22 on hub 30 is described above, it is contemplated that more than one wheel 22 may be assembled on to hub 30. In particular, as discussed above, hub 30 may include more than one annular channel 136. For example, a first annular channel 136 may be disposed between rear end 60 and stub end 130. A second annular channel 136 may also be disposed between front end 58 and rear end 60 of splined portion 50. A first wheel 22 may be assembled on hub 30 by allowing first, second, third, and fourth tabs 220, 222, 224, 226 of first wheel 22 to slide within first, second, third, and fourth slots 92, 94, 96, 98, respectively, until first, second, third, and fourth tabs 220, 222, 224, 226 abut rear wall 142 of channel 136 adjacent rear end 60. First wheel 22 may be turned in a clockwise or counter-clockwise direction to ensure first, second, third, and fourth tabs 220, 222, 224, 226 are received within tab lock portions 138 of channel 136 adjacent rear end 60. Rim 32 of a second wheel 22 may then be pushed onto hub 30 by allowing first, second, third, and fourth tabs 220, 222, 224, 226 of second wheel 22 to slide within first, second, third, and fourth slots 92, 94, 96, 98, respectively, until first, second, third, and fourth tabs 220, 222, 224, 226 abut first wheel 22. Second wheel 22 may 22 may be turned in a clockwise or counter-clockwise direction to ensure first, second, third, and fourth tabs 220, 222, 224, 226 are received within tab lock portions 138 of second channel 136 disposed between front end 58 and rear end 60. Locking blocks 36 may be inserted into first, second, third, and fourth notches 172, 174, 176, 178, of rim 32 of second wheel 22 so that first portions 236 of bottom surfaces 234 of locking blocks 36 engage with and abut first, second, third, and fourth notch bottom walls 206, 208, 210, 212, respectively, of rim 32 of second wheel 22. Second portions 238 of bottom surfaces 234 of locking blocks 36 may also engage with and abut shoulders 118 of first, second, third, and fourth slots 92, 94, 96, 98, respectively. Bolts 38 may be inserted through holes (not shown) in locking blocks 36 to threadingly engage with bolt holes 120 in shoulders 118. Bolts 38 may be torqued to a predetermined torque to fasten first and second wheels 22 onto hub 30 of axle 24. A similar process may be used to assemble more than two wheels 22 onto hub 30 of axle 24.

It will be apparent to those skilled in the art that various modifications and variations can be made to the disclosed wheel assembly. Other embodiments will be apparent to those skilled in the art from consideration of the specification and practice of the disclosed wheel assembly. It is intended that the specification and examples be considered as exemplary only, with a true scope being indicated by the following claims and their equivalents.

What is claimed is:

1. A wheel assembly, comprising:
   a hub, including:
      a splined portion extending from a front end of the splined portion to a rear end of the splined portion, the splined portion comprising:
         a first spline;
         a second spline; and
         a slot separating the first spline and the second spline, the first spline, the second spline, and the slot extending from the front end of the splined portion to the rear end of the splined portion;
      a stub extending between the rear end of the splined portion to a stub end; and
      a base extending between the stub end and a base end, such that the splined portion, the stub, and the base define an annular channel disposed between the rear end of the splined portion and the stub end;
   a rim including: an outer rim configured to mount a tire;
      an inner rim extending from a rim front end to a rim rear end, the inner rim including:
         a notch disposed at the rim front end; and
         a tab disposed at the rim rear end, the tab configured to slidingly engage with the slot and be received in the annular channel such that the tab is rotatable in the annular channel to a position where the slot aligns with the notch;
      a locking block configured to slidingly engage with the notch and the slot at the front end of the splined portion; and
      a bolt connecting the locking block to the hub.

2. The wheel assembly of claim 1,
   wherein the splined portion, the stub, and the base are disposed coaxially.

3. The wheel assembly of claim 1, wherein the annular channel includes a tab lock portion having:
   a front wall;
   a rear wall; and
   a bottom wall extending between the front wall and the rear wall.

4. The wheel assembly of claim 3, wherein the tab is configured to be rotatably received in the tab lock portion between the front wall and the rear wall.

5. The wheel assembly of claim 1, wherein the slot includes:
   a locking slot extending from the front end of the splined portion to a distal end disposed between the front end of the splined portion and the rear end of the splined portion; and
   a guiding slot extending from the distal end to the rear end of the splined portion.

6. The wheel assembly of claim 5, wherein
   the locking slot has a first bottom surface;
   the guiding slot has a second bottom surface; and
   a shoulder extends from the first bottom surface to the second bottom surface.

7. The wheel assembly of claim 6, wherein the shoulder includes a bolt hole configured to threadingly receive the bolt.

8. The wheel assembly of claim 1, wherein the inner rim includes:
   a first rim section disposed at the rim front end, the first rim section extending circumferentially between a first leading rim wall and a first trailing rim wall; and
   a second rim section disposed at the rim front end, the second rim section extending circumferentially between a second leading rim wall and a second trailing rim wall, wherein the notch is disposed between the first trailing rim wall and the second leading rim wall.

9. The wheel assembly of claim 8, wherein the tab is disposed between the first leading rim wall and the first trailing rim wall.

10. The wheel assembly of claim 1, wherein the tab is circumferentially offset relative to the notch.

11. A hub configured to receive a rim having an inner rim and an outer rim, the inner rim extending from a rim front end to a rim rear end, the hub comprising:
   a splined portion extending from a front end of the splined portion to a rear end of the splined portion, the splined portion including:
      a first spline extending along a length of the splined portion;
      a second spline extending along the length of the splined portion; and
      a slot separating the first spline and the second spline;
   a stub extending between the rear end of the splined portion and a stub end; and
   a base extending between the stub end and a base end, wherein the splined portion, the stub, and the base are disposed coaxially such that an annular channel is defined between the rear end of the splined portion and the stub end, wherein the annular channel is configured to receive a tab disposed at the rim rear end such that the tab is rotatable in the annular channel to a position where the slot aligns with a notch disposed at the rim front end; wherein the hub is configured to receive a locking block wherein the locking block is configured to slidingly engage with the notch and the slot.

12. The hub of claim 11, wherein
   the base has a generally cylindrical shape, the base having a first diameter,
   the stub has a generally cylindrical outer surface having a second diameter, and the first diameter is larger than the second diameter.

13. The hub of claim 11, wherein the slot includes:
   a locking slot extending from the front end of the splined portion to a distal end disposed between the front end of the splined portion and the rear end of the splined portion; and
   a guiding slot extending from the distal end to the rear end of the splined portion.

14. The hub of claim 13, wherein
   the locking slot has a first bottom surface;
   the guiding slot has a second bottom surface; and
   a shoulder extends from the first bottom surface to the second bottom surface.

15. The hub of claim 14, wherein the shoulder includes a bolt hole configured to receive a bolt.

16. The hub of claim 11, wherein:
   the first spline extends circumferentially from a first leading edge to a first trailing edge spanning a first angle; and the second spline extends circumferentially from a second leading edge to a second trailing edge spanning a second angle different from the first angle.

17. A rim for a wheel, comprising:
an outer rim configured to mount a tire; and
an inner rim attached to the outer rim, the inner rim extending from a rim front end to a rim rear end and including:
a an inner surface;
a notch disposed at the rim front end, the notch extending from the rim front end to a notch end disposed between the rim front end and the rim rear end; and
a tab disposed at the rim rear end, the tab extending radially inward from the inner surface,
wherein the rim is configured to be mounted on a hub comprising a stub, a base, and a splined portion comprising a first spline and a second spline wherein a slot separates the first spline and the second spline wherein the stub, the splined portion and the base are coaxially disposed such that an annular channel is defined between the splined portion and the base,
wherein the tab is configured to be received in the annular channel such that the tab is rotatable in the annular channel to a position where the notch aligns with the slot; wherein the rim is configured to receive a locking block wherein the locking block is configured to slidingly engage with the notch and the slot.

18. The rim of claim 17, wherein the inner rim includes:
a first rim section disposed at the rim front end, the first rim section extending circumferentially between a first leading rim wall and a first trailing rim wall; and
a second rim section disposed at the rim front end, the second rim section extending circumferentially between a second leading rim wall and a second trailing rim wall, wherein the notch is disposed between the first trailing rim wall and the second leading rim wall.

19. The rim of claim 18, wherein the tab is disposed between the first leading rim wall and the first trailing rim wall.

20. The rim of claim 17, wherein the inner rim and the outer rim form an integrated structure.

* * * * *